United States Patent [19]
Shin et al.

[11] Patent Number: 5,539,782
[45] Date of Patent: Jul. 23, 1996

[54] DIGITAL DATA RECEIVER

[75] Inventors: Hyunsoo Shin; Humor Hwang, both of Suwon, Rep. of Korea

[73] Assignee: Samsung Electronics Co., Ltd., Kyungki-do, Rep. of Korea

[21] Appl. No.: 424,213

[22] Filed: Apr. 19, 1995

Related U.S. Application Data

[62] Division of Ser. No. 274,030, Jul. 12, 1994.

[30]   Foreign Application Priority Data

Jul. 12, 1993 [KR]   Rep. of Korea ............... 93-13025

[51] Int. Cl.$^6$ ........................................... H04L 7/00
[52] U.S. Cl. ........................................ 375/355; 327/141
[58] Field of Search ............................ 375/317, 355, 375/316; 327/141

[56]   References Cited

U.S. PATENT DOCUMENTS

| | | | |
|---|---|---|---|
| 4,805,191 | 2/1989 | Burch et al. ........................ | 375/335 |
| 4,815,103 | 3/1989 | Cupo et al. ........................ | 375/355 |

FOREIGN PATENT DOCUMENTS

| | | | |
|---|---|---|---|
| 0389027 | 9/1990 | European Pat. Off. ............... | 375/355 |

*Primary Examiner*—Stephen Chin
*Assistant Examiner*—T. Ghebretinsae
*Attorney, Agent, or Firm*—Sughrue, Mion, Zinn, Macpeak & Seas

[57]   ABSTRACT

An apparatus for restoring a symbol timing of a signal received at a receiving side of a digital communication system. The invention includes a first sampling section which is applied with a received signal, for sampling in accordance with a first frequency higher than the sampling frequency possessed by the received signal; a second sampling section which is applied with an output signal of the first sampling section, for sampling in accordance with a first clock signal applied from a symbol timing restoring circuit; an equalizer which is applied with the output signal of the second sampling section for equalizing; a third sampling section which is applied with the output signal of the equalizer, for sampling in accordance with a second clock signal applied from the symbol timing restoring circuit; and a symbol timing restoring circuit which is applied with the output signal of the second sampling section for detecting a present sampling position and generating the first clock signal and the second clock signal variably changed with the sampling position based on the detected present sampling position and an optimum sampling position. Accordingly, a tracing of an optimum sampling position is possible, and further a sampling position tracing even with respect to the position between samples is possible, so that more exact restoration of the symbol data is possible.

2 Claims, 6 Drawing Sheets

$P_s < P_{opt}$ $P_s > P_{opt}$ $P_s = P_{opt}$

DIGITAL DATA RECEIVER

BACKGROUND ART

This is a divisional of application Ser. No. 08/274,030 filed Jul. 12, 1994.

The present invention relates to a digital data receiver, and more particularly to a digital data receiver for restoring a symbol timing of received signal and processing data sampled in response to the restored symbol timing.

In general, in a digital communication apparatus such as a digital high picture quality television, a transmitter transmits after modulating a data bit stream consisting of "0'" and "1'" to form an analog signal by using an appropriate modulating technique such as quadrature amplitude modulating QAM or quadrature phase shift keying QPSK, and a receiver restores by demodulating and sampling the transmitted analog signal to form the original data bit stream. At this moment, since the demodulated signal at a receiving side is an analog signal, an A/D conversion or a sampling for converting the analog signal to an original digital data is required. Accordingly, in restoring an exact symbol value from the demodulated signal at the receiving side, a most important factor is to exactly define a sampling position.

Generally, it is impossible to know the exact sampling position with regard to the transmitted signal at the receiving side. Accordingly, it is required to define the exact sampling position from exterior, and this sampling position defining is called as a 'symbol timing'. As methods for restoring a symbol timing, there are a method for directly finding out an optimum sampling position from the analog signal input to the receiver, and a method for finding out an optimum sampling position by utilizing the data converted by analog-digital converted data.

As a prior art reference for finding out an optimum sampling position by using an analog-digital converted data, there is a U.S. Pat. No. 4,707,841 to Yen at al. issued on Nov. 11, 1987. In accordance with this reference, the received signal is asynchronously sampled at a minimum sampling rate in proportion to a channel band width, and the digitalized samples are stored to a memory. The stored data is processed by using an interpolation technique for restoring an appropriate symbol timing, and an appropriate symbol timing is obtained by a phase slide controller. Data bases are detected from aforesaid memory based on information obtained by equalization and decoding of the symbol data controlled via phase slide.

The present invention offers a technique for restoring a symbol timing from a received signal by a method different from aforesaid prior art.

SUMMARY OF THE INVENTION

Therefore, it is an object of the present invention to provide a digital data receiver for sampling the received signal by a frequency higher than the frequency of the received symbol, detecting timing information with respect to a present sampling time point of the digital symbol data obtained by the sampling, and restoring an optimum symbol timing based on the detected timing information.

This object is accomplished by a digital receiver for processing information which is encoded by a number of symbols and transmitted as an analog signal comprising, a first sampling section which is applied with a received signal and for sampling in accordance with first frequency higher than the sampling frequency possessed by the receiver signal; second sampling section which is applied with an output signal of the first sampling section and for outputting by sampling in accordance with first clock signal applied from a symbol timing restoring circuit; an equalizer which is applied with the output signal of the second sampling section and outputting by equalizing; third sampling section which is applied with the output signal of the equalizer and outputting by sampling in accordance with a second clock signal applied from the symbol timing restoring circuit; and a symbol timing restoring circuit which is applied with the output signal of the second sampling section and detects a present sampling position and generates the first clock signal and the second clock signal variably changed with the sampling position based on the detected present sampling position and an optimum sampling position.

DETAILED DESCRIPTION OF THE PREFERRED EMBODIMENTS

Figure 1:
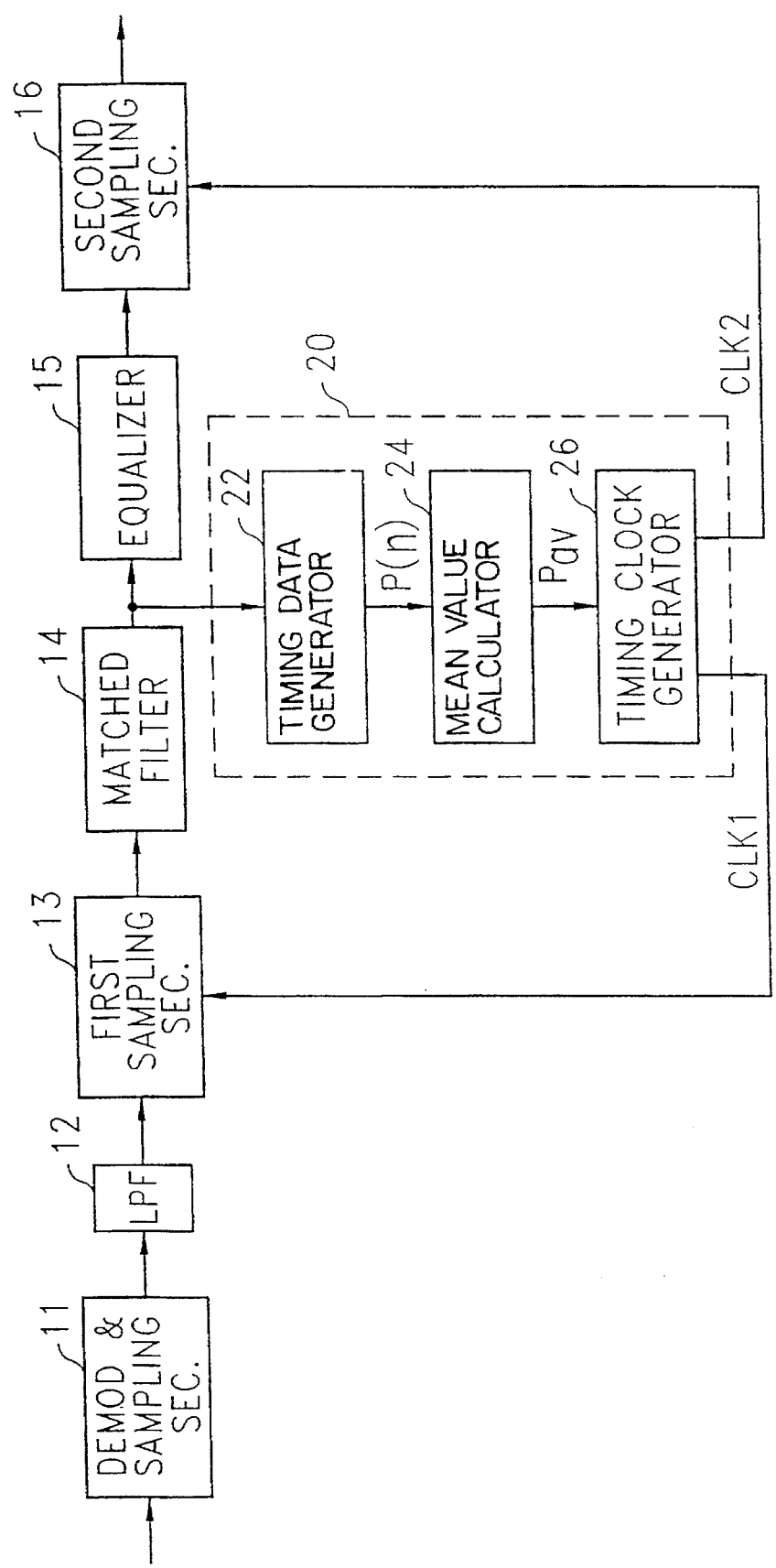
FIG. 1 is a block diagram showing a preferred embodiment of a digital data receiver in accordance with the present invention.

Hereinafter, a preferred embodiment of the present invention is described in more detail with reference to the accompanying drawings. An apparatus of FIG. 1 is applied with an analog signal transmitted in a form of a complex signal. A demodulation and sampling section 11 demodulates the received analog signal, and samples the demodulated signal by an frequency 8fs eight times the frequency of a symbol frequency fs possessed by the transmitted symbols. As a result, one symbol is sampled by eight symbols. The demodulated and sampled data is input to a low pass filter 12 LPF and then, sampled again to "4:1" by a first sampling section 13, and outputs a frequency 2fs of double the symbol frequency fs. Here, the first sampling section 13 samples the output data of the low pass filter 12 in accordance with a first clock CLK1 applied from a symbol timing restoring circuit 20. The output data of the first sampling section 13 is input to a matched filter 14 and then, passes through an equalizer and is sampled again to "2:1" at a second sampling section 16, which outputs symbol data having a symbol frequency fs. Here, the second sampling section 16 samples the output data of the equalizer 15 in accordance with a second clock CLK2 applied from the symbol timing restoring circuit 20. On the other hand, the output data of the matched filter 14 are fed to a timing data generating section 22.

Figure 2:
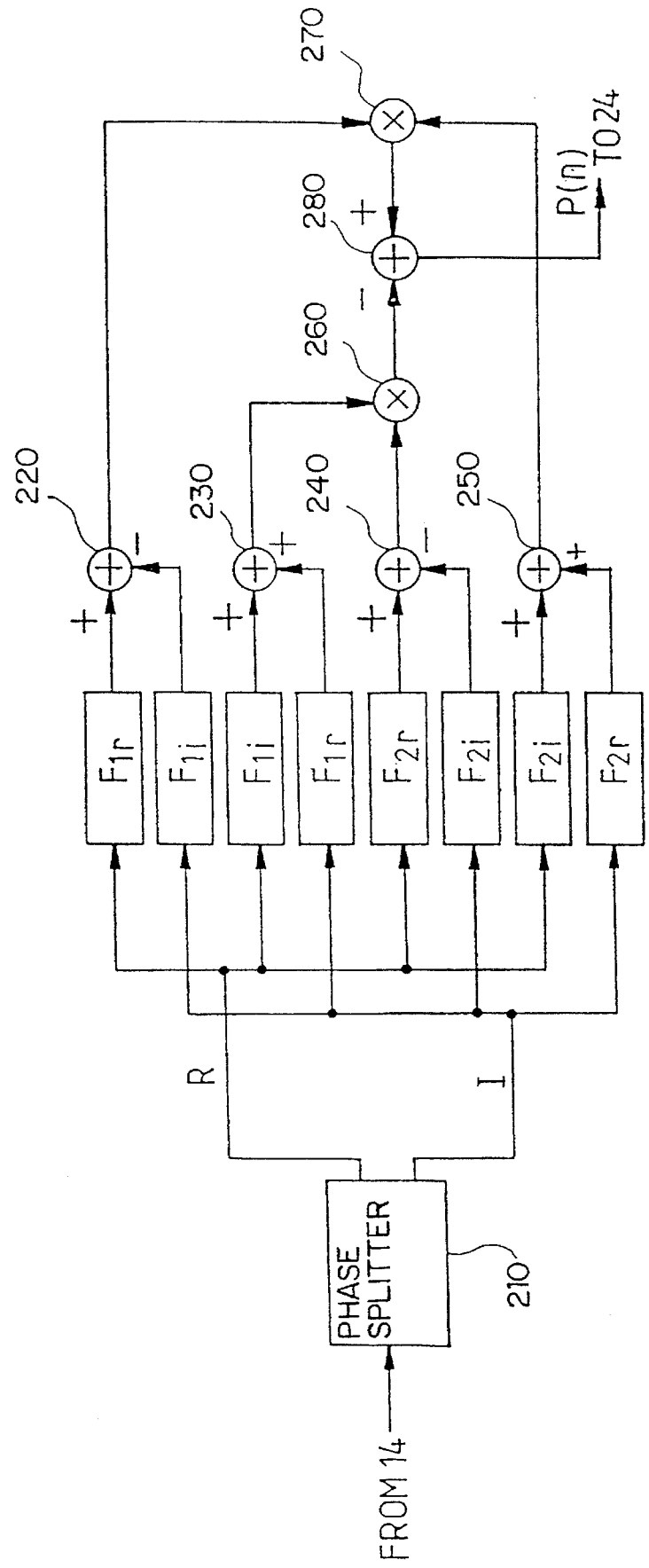
FIG. 2 is a detailed block diagram of the timing data generating section of FIG. 1, FIG. 3(A)–3(C) are waveform charts for the timing data generating section.

A detailed block diagram of the timing data generating section 22 is shown in FIG. 2. The timing data generating section 22 includes eight band pass filters (F1r, F1i, ..., F2i, F2r) having a center frequency corresponding to "+−½T" (here, T is a symbol timing period or a sampling period), five adders (220, 230, 240, 250, 280), and two multipliers (260, 270). The sampled data fed from the matched filter 14 are divided into real quantity data R and imaginary quantity data I at a phase splitter 210. The real quantity data R and the imaginary quantity data I are respectively fed to a set of eight band pass filters (F1r, F1i, ..., F2i, F2r), wherein the set of eight band pass filters (F1r, F1i, ..., F2i, F2r) which are composed of four kinds of filters (F1r, F1i, F2r F2i) having a filtering characteristic by according to the following expressions.

$$F_{i,r}(Z) = \frac{1 - \upsilon\cos2\pi f_i T Z^{-1}}{1 - 2\upsilon\cos2\pi f_i T Z^{-1} + \upsilon^2 Z^{-2}}$$

$$F_{i,i}(Z) = \frac{\upsilon\sin2\pi f_i T Z^{-1}}{1 - 2\upsilon\cos2\pi f_i T Z^{-1} + \upsilon^2 Z^{-2}}$$

wherein, $f_i = (-1)^i \frac{1}{2T}$, $T = \frac{T}{2}$

The real quantity data R outputted from the phase splitter 210 are respectively fed to four filters of different kinds from each other, and the imaginary quantity data I are respectively fed to four filters of the remaining other kinds. Disposition of the filters (F1r, F1i, ..., F2i, F2r) applied with the real quantity data R and the imaginary quantity data I is as shown in FIG. 2.

The output signals of the eight filters (F1r, F1i, ..., F2i, F2r) are added as shown in FIG. 2 by the four adders (220, 230, 240, 250), and the output signals of the four adders (220, 230, 240, 250) are multiplied as shown in FIG. 2 by the two multipliers (260, 270) and then, the output signals of two multipliers are added again. As to that result, wave forms of positional information(P(n)) in regard to the timing data generating section 22 are shown in FIG. 3A to FIG. 3C.

Figure 3A:
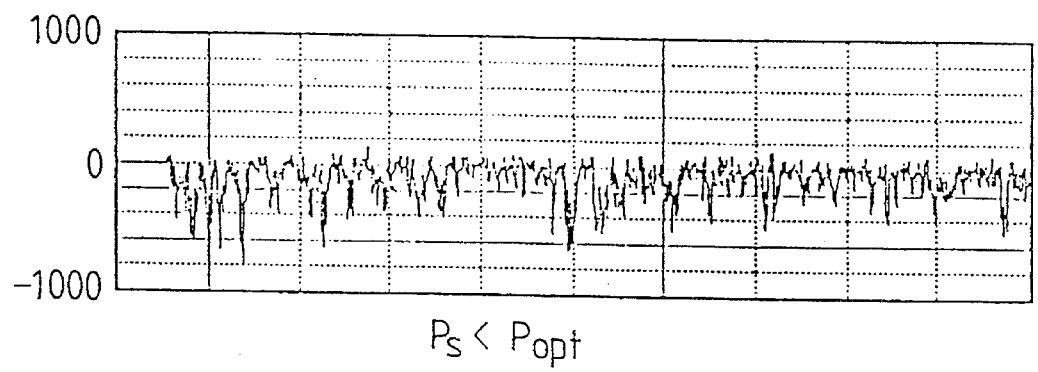
Figure 3B:
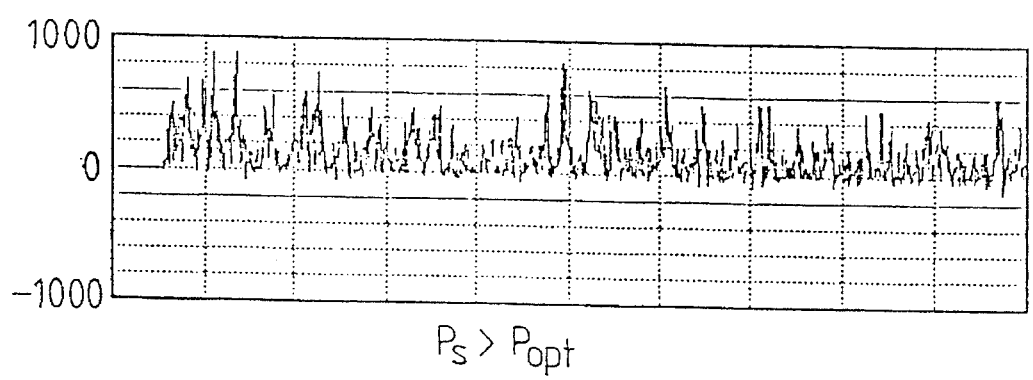
Figure 3C:
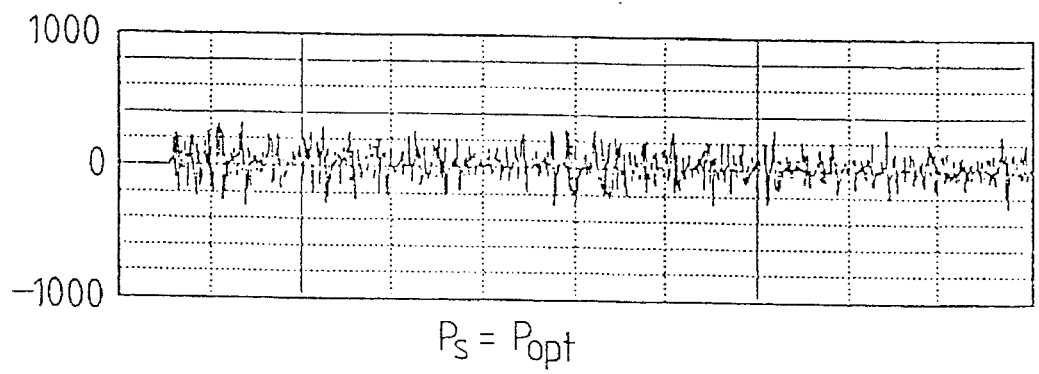

FIG. 3A is a wave form chart of the positional information (P(n)) of a case in which the present sampling position (Ps) is faster than an optimum sampling position (Popt), and most of the signals have negative amplitude values. FIG. 3B is a wave form chart of the positional information (P(n)) of a case in which the present sampling position (Ps) is slower than an optimum sampling position (Popt), and most of the signals have positive amplitude values. FIG. 3C is a wave form chart of the positional information (P(n)) of a case in which the present sampling position (Ps) and the optimum sampling position (Popt) are accorded, and the amplitude of the signal has almost a constant distribution to both of positive and negative amplitude values. The output signal of this timing data generating section 22 is fed to an averager 24 and thereby an average value (Pav) in regard to the symbols of N numbers is obtained. A detailed block diagram of this averager 24 is shown in FIG. 4.

Figure 4:
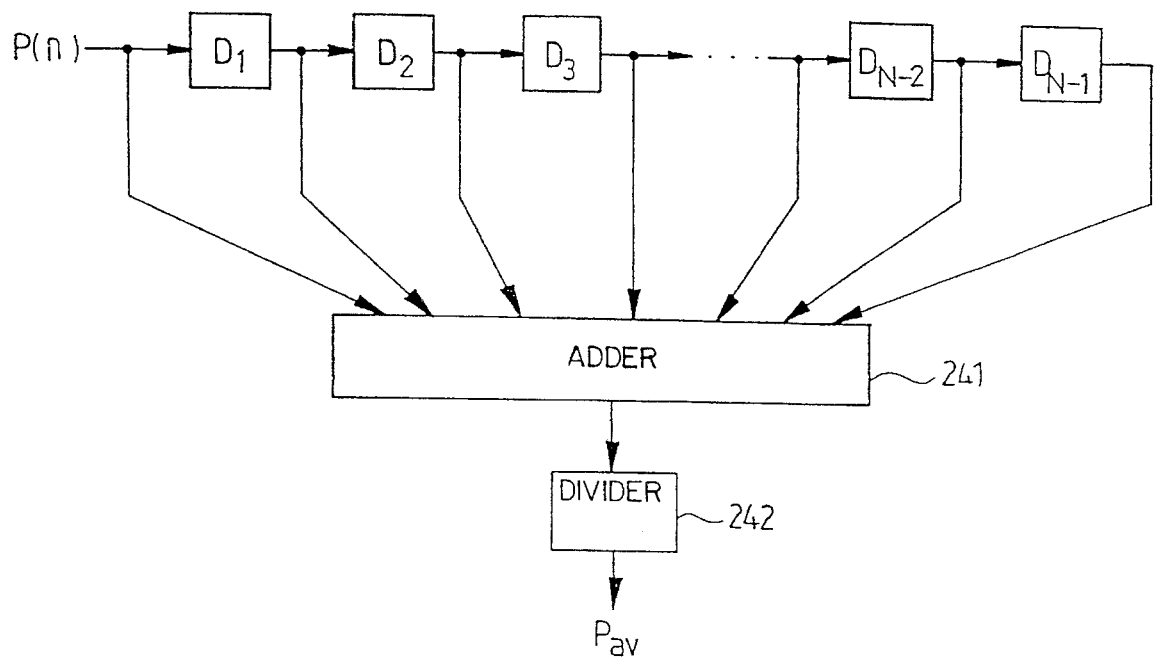
FIG. 4 is a detailed block diagram of an averager.

The averager 24 shown in FIG. 4 includes delayers (D1–Dn−1) of "n−1" numbers, an adder 241, and a divider 242. The positional information (P(n)) of the timing data generating section 22 inputted to the averager 24 are delayed in turn at the delayers (D1 to Dn−1) of "n−1" numbers. The positional information (P(n)) applied to the present averager 24 and the output signals of each of the delayers (D1, ..., Dn−1) are added by adder 241. A divider 242 divides the summed value of the positional information(P(p)) corresponding to the symbols of "N" numbers added by the adder 241, by the number of symbols "N", and generates an average value (Pav). The average value (Pav) obtained at the averager 24 is fed to a timing clock generating section 26.

Figure 5:
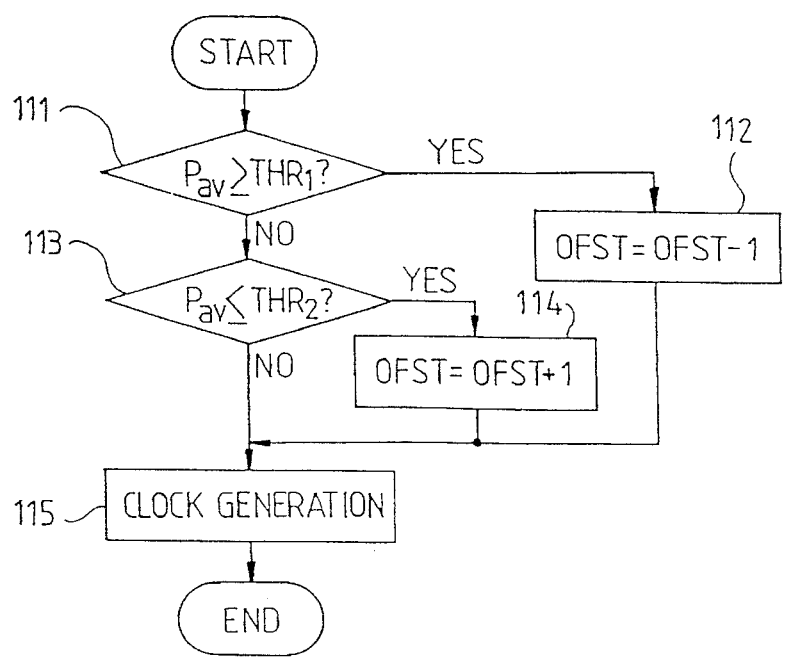
FIG. 5 is a flow chart of operation of the timing clock generating section.

The timing clock generating section 26 compares the average value (Pav) with predetermined threshold values (THR1, THR2), and in accordance with its result, makes the position of the sampling points to be faster or slower by one sample. Operational flow chart of this timing clock generating section 26 is shown in FIG. 5.

The timing clock generating section 26 compares the average value (Pav) fed from the averager 24 with a predetermined threshold value THR1 (step 111). By the comparison, when the average value (Pav) is greater than or equal to the threshold value THR1, the timing clock generating section 26 decreases the clock offset value OFST by one (step 112), and generates the clocks CLK1, CLK2 such that the sampling position has become by one sample (step 115). On the other hand, when the average value (Pav) is less than the positive threshold value THR1, the timing clock generating section 24 compares the average value (Pav) with the negative threshold value THR2 (step 113). As to that result, when the averager value (Pav) is less than or equal to the negative threshold value THR2, the timing clock generating section generates the clocks CLK1, CLK2 in which the clock offset value OFST is increased by one (step 114) and the sampling position is slowed by one sample (step 115). On the contrary, when the average value (Pav) is bigger than the negative threshold value THR2, that is, when the average value (Pav) is between the positive threshold value THR1 and the negative threshold value THR2, such the timing clock generating section 26 generates the clocks CLK1, CLK2 such that the present sampling position is maintained (step 115). The first clock CLK1 of the clocks generated at the clock generating step (step 115) has a sampling frequency of 2fs, and the second clock CLK2 has a sampling frequency of fs. At this time fs=(OFST+T)−1.

Thus, the optimum symbol timing can be traced by variably changing the sampling position in accordance with its compared result.

However, there may be no sample that represents an optimum symbol position of eight samples of "8fs" outputted from the low pass filter 12. In this case, for the method shown in FIG. 5 and described above, a sampling position being near to the optimum sampling position can be defined, but it is difficult to find out the optimum sampling position.

Figure 6:
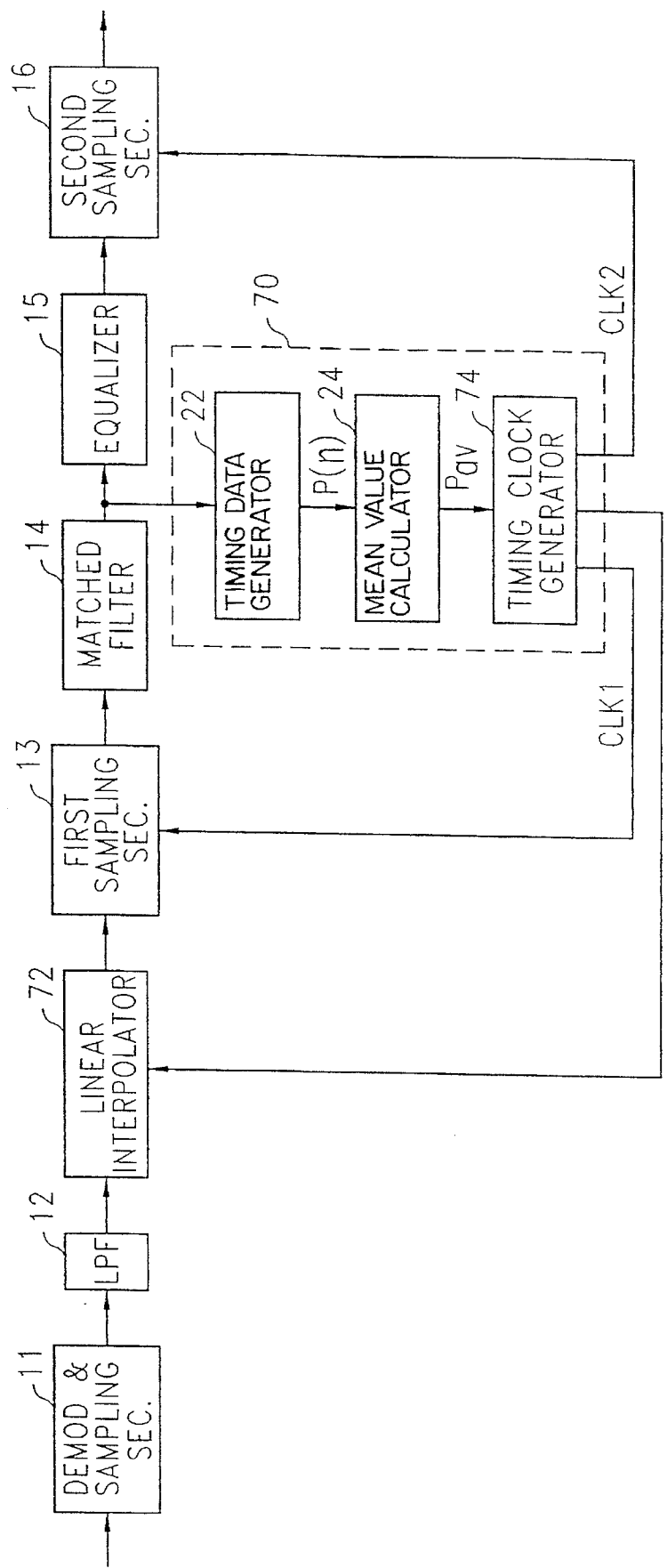
FIG. 6 is a block diagram showing another embodiment of the digital data receiver in accordance with the present invention.

A symbol timing restoring apparatus which corrects this shortcoming is shown in FIG. 6. The apparatus of FIG. 6 includes a linear interpolator 72 additionally provided between the low pass filter 12 and the first sampling section 13. And, the timing clock generating section 26 of FIG. 1 is substituted for the timing clock generating section 74 and having a function of generating an interpolation coefficient y. The aforementioned linear interpolator 72 produces an output by interpolating the data sampled in accordance with the interpolation coefficient y fed from the timing clock generating section 74. The operation of the timing data generating section 22 and the averager 24 is the same as that described for the apparatus of FIG. 1, and the timing clock generating section 74 executes the signal processing in accordance with the flow chart of FIG. 7 which is similar to FIG. 5.

Figure 7:
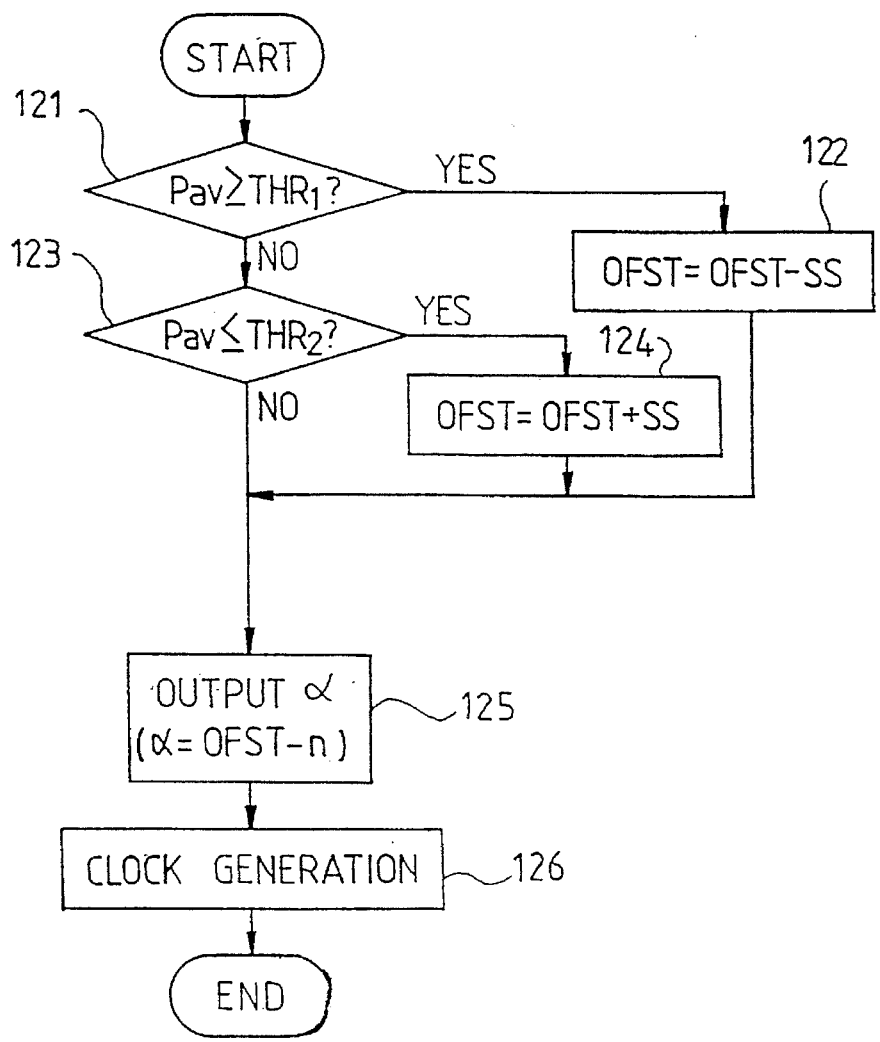
FIG. 7 is a flow chart of operation of the timing clock generating section of FIG. 6.
Figure 8:
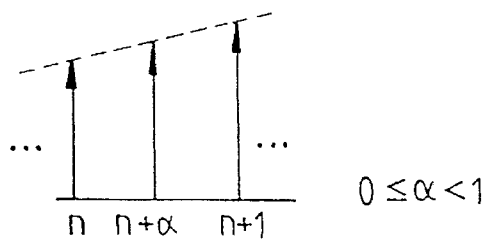
FIG. 8 is a conceptual diagram for explaining a linear interpolator.

In FIG. 7, when the average value (Pav) is greater than or equal to the positive threshold value THR1 (step 121), the timing clock generating section 74 decreases the clock offset value OFST by a predetermined magnitude of step size SS (step 122). On the contrary, when the average value (Pav) is less than the positive threshold value THR1, the timing clock generating section 72 compares whether or not the average value (Pav) is less than or equal to the negative threshold value THR2 (step 123). As to that result, when the average value (Pav) is less than or equal to the negative threshold value THR2, the timing clock generating section 72 increases the clock offset value OFST such by a predetermined magnitude of step size SS (step 124). Here, the magnitude of the step size SS is set to less than "1". The timing clock generating section 72 eliminates an integral number (n) at the offset OFST that the step size SS of less than "1" is added or subtracted whereby obtaining interpolation coefficient y corresponding to a fractional number (step 125). Then, this interpolation coefficient y is transmitted to the above described linear interpolator 72. Further, the timing clock generating section 74 generates a clock having a frequency of "2fs" and "2fa" (step 126). At this moment, the symbol frequency is "fs=(n+T)−1. The linear interpolator 72 is fed with the interpolation coefficient y from the timing clock generating section 74 and executes the linear interpolation as shown in FIG. 8. As to that result, the output data of the linear interpolator 72 becomes the data in regard to the samples of the position moved by as much as the interpolation coefficient y from each position of eight samples outputted from the demodulating and sampling section 11. The samples of the position moved as much as the interpolation coefficient y are sampled with the symbol frequency of 2fs by the first sampling section 13, and used for an optimum symbol timing restoring by the symbol timing restoring circuit 70. Accordingly, the apparatus of FIG. 6 is able to trace at optimum sampling position with respect to not only the eight samples outputted from the demodulating and sampling section 11, but also positions between the eight samples.

As described above, the digital data receiver in accordance with the present invention, for restoring the symbol timing at the digital communication apparatus, makes it possible to restore more exact symbol timing by variably changing the sampling position based on the averager value of the relative positional information with regard to respective symbols and further by enabling the sampling position tracing with regard to the position between samples.

What is claimed is:

1. A method for restoring a symbol timing of a received signal first sampled at a first frequency in a first sampling means, equalized and second sampled at a second frequency in a second sampling means, comprising the steps of:

determining an average value of positional information of a present sampling position of the first sampled signal;

a first comparison step for comparing the determined average value and a predetermined positive threshold value;

a first adjusting step for adjusting the present sampling position to be faster by a predetermined magnitude when the average value is greater than or equal to the positive threshold value;

a second comparison step for comparing the average value and a predetermined negative threshold value when the average value is less than the positive threshold value compared in the first comparison step;

a second adjusting step for adjusting the sampling position by a predetermined magnitude when the average value is less than or equal to the negative threshold value compared in the second comparison step; and a step for maintaining the present sampling position when the average value is greater than the negative threshold value and less than positive threshold value; and a step for generating a first clock signal applied to the first sampling means and a second clock signal applied to said second sampling means each having the adjusted sampling position.

2. A method for restoring a symbol timing, according to claim 1, further comprising the steps of:

a first adjustment step for adjusting said sampling position to be faster by a predetermined value than the first sampling means in accordance with the result of said first comparison step;

a second adjustment step for adjusting said sampling position to be slower by a predetermined value being less than the first sampling means in accordance with the result of said second comparison step; and step for generating an interpolation coefficient based on the results of the first and second adjusting steps.

* * * * *